United States Patent
Dawson et al.

(10) Patent No.: US 10,240,721 B2
(45) Date of Patent: Mar. 26, 2019

(54) METHOD, APPARATUS, AND SYSTEM FOR REFUELING HYDROGEN VEHICLES

(71) Applicant: OneH2, Inc., Longview, NC (US)

(72) Inventors: Paul A. Dawson, Hickory, NC (US);
Franklin D. Lomax, Hector, NY (US);
Rafael S. Lemos, Houston, TX (US);
David Houng, Randolph, NJ (US)

(73) Assignee: ONEH2, INC., Longview, NC (US)

( * ) Notice: Subject to any disclaimer, the term of this patent is extended or adjusted under 35 U.S.C. 154(b) by 67 days.

(21) Appl. No.: 15/284,912

(22) Filed: Oct. 4, 2016

(65) Prior Publication Data
US 2017/0102110 A1 Apr. 13, 2017

Related U.S. Application Data

(60) Provisional application No. 62/238,785, filed on Oct. 8, 2015.

(51) Int. Cl.
*F17C 5/06* (2006.01)

(52) U.S. Cl.
CPC ........ *F17C 5/06* (2013.01); *F17C 2205/0142* (2013.01); *F17C 2205/0153* (2013.01); *F17C 2205/054* (2013.01); *F17C 2205/058* (2013.01); *F17C 2221/012* (2013.01); *F17C 2223/036* (2013.01); *F17C 2225/036* (2013.01); *F17C 2227/042* (2013.01); *F17C 2250/032* (2013.01); *F17C 2250/0434* (2013.01); *F17C 2265/065* (2013.01)

(58) Field of Classification Search
CPC .................. F17C 5/06; F17C 2227/043; F17C 2221/012; F17C 2205/0326; F17C 2205/037; F17C 2265/065
See application file for complete search history.

(56) References Cited

U.S. PATENT DOCUMENTS

| 3,719,196 | A | 3/1973 | McJones |
| 6,755,225 | B1 | 6/2004 | Niedwiecki et al. |
| 6,786,245 | B1 | 9/2004 | Eichelberger et al. |
| 7,178,565 | B2 | 2/2007 | Eichelberger et al. |
| 8,453,682 | B2 | 6/2013 | Bonner et al. |
| 2004/0163731 | A1* | 8/2004 | Eichelberger ............ B60S 5/02 141/284 |

(Continued)

Primary Examiner — Timothy L Maust
Assistant Examiner — Timothy P Kelly
(74) Attorney, Agent, or Firm — Mori & Ward, LLP

(57) ABSTRACT

A dispenser apparatus that includes a first cascade stage having a first connector configured to connect to and disconnect from a first gas storage vessel, and a first conduit connected to the first connector and having a first valve and a first pressure measuring device, and a second cascade stage having a second connector configured to connect to and disconnect from a second gas storage vessel, and a second conduit connected to the second connector and having a second valve and a second pressure measuring device. A common flow path is fluidly connected to the conduits, and has a dispensing nozzle to connect to a vehicle during refueling. A controller is provided to control the first and/or second valve(s) to perform refueling using gas stored in at least one of the first and second gas storage vessels based on pressure measurements of the first and/or second pressure measuring device(s).

21 Claims, 5 Drawing Sheets

(56) References Cited

U.S. PATENT DOCUMENTS

2007/0034283 A1* 2/2007 Plummer ................. F17C 6/00
                                                                         141/234
2007/0215209 A1* 9/2007 Street ........................ F17C 5/06
                                                                         137/263

* cited by examiner

METHOD, APPARATUS, AND SYSTEM FOR REFUELING HYDROGEN VEHICLES

CROSS-REFERENCE TO RELATED APPLICATION

The present application claims priority to U.S. Provisional Application No. 62/238,785, filed on Oct. 8, 2015, the entire contents of which are herein incorporated by reference.

BACKGROUND OF THE INVENTION

Field of the Invention

The present invention relates to refueling of hydrogen vehicles.

Discussion of the Background

Hydrogen fueled vehicles are known, and have been extant for many years. The most common type of hydrogen fueled vehicle uses compressed gaseous hydrogen storage on the vehicle, and is fueled with gaseous hydrogen at the point of dispensing. Alternative forms of storing the hydrogen on the hydrogen powered vehicle have not proven commercially important, such as cryogenic liquid, cryogenic gas, metal or chemical hydrides, etc. Typically, the point of refueling for hydrogen vehicles is remote from the point of production of hydrogen, requiring the hydrogen to be transported to the point of refueling.

Solutions to delivering hydrogen include compressed gas in pressure vessels (or cylinders), or cryogenic liquid hydrogen delivered in a cryogenic tanker truck. This delivered hydrogen can then be pressurized using a compressor or cryogenic pump to a pressure at or above that required in the hydrogen powered vehicle. For the purposes of minimizing the size of the pressurization equipment, gaseous hydrogen could be stored in a series of pressurized cylinders which are then used as a source to rapidly fill hydrogen powered vehicles through a series of valves, piping and controls referred to as a dispenser. In some methods, the sum of apparatus making up the dispenser may be in a single assembly at one location, or may be dispersed at multiple locations at or near the point of refueling which are connected together by piping, tubing, electrical connectors, etc. to effect coordinated operation to refuel the hydrogen powered vehicle to a pre-determined pressure.

When a cascade of pressure cylinders is employed, one practice is to sequentially fill the hydrogen powered vehicle onboard storage starting with a predetermined cylinder having the lowest pressure at the beginning of the refilling sequence, and subsequently connecting each of the higher pressure sources in their respective predefined order of increasing pressure until the vehicle reaches its target pressure. In this way, the required volume of the pressure cylinders can be minimized, or conversely to maximize the number of vehicles which may be sequentially refilled with a given number and capacity of cylinders can be maximized. An early example of this method is described in U.S. Pat. No. 3,719,196.

Refueling systems of the type described above have some salient disadvantages. First, they require that a compressor be installed at the point of refueling. Compressors suitable for high pressure hydrogen service, though known and quite proven, have substantial requirements for ongoing maintenance, and require substantial skill and care in siting, sizing, installation and commissioning. Although all of these tasks are readily accomplished, they impose substantial burdens in terms of financial cost, time required to bring a refueling station into service, and the degree of skill and number of staff needed to successfully support the ongoing operation of the refueling facility. Likewise, due to the substantial size of the compressor itself, the cascade cylinders, the dispenser, and the truck delivering the hydrogen by trailer equipped with cryogenic storage or compressed gas cylinders, the area required for the refueling operation is undesirably large. It may not be feasible to site all of the needed equipment at a location which otherwise would be provided with hydrogen refueling.

Furthermore, the cost and time needed for the solution described above is difficult to justify unless a large number of hydrogen powered vehicles is present. Likewise, if refueling hydrogen powered vehicles is discontinued for any reason, all of the site preparation costs and time invested in the installation of the traditional solution are lost. This results in a need to either have extreme certainty that refueling will not be discontinued, or the need to repay the costs of the installation very rapidly.

Other solutions attempt to solve the problems described above by bringing one or more pieces of the above solution to the site of refueling using a transportable solution. For instance, U.S. Pat. No. 6,755,225 describes a transportable system including composite cylinders, a compressor for filling composite cylinders, and optional additional equipment, such as potentially a hydrogen generating means.

U.S. Pat. No. 6,786,245 and U.S. Pat. No. 7,178,565 describe alternative transportable refueling station solutions, where no compressor is required, and where a self-contained power system is supplied to eliminate the need for connections to any site utilities.

U.S. Pat. No. 8,453,682 describes a method of refueling hydrogen powered vehicles where multiple transportable, manifolded cylinder assemblies are used. The method of the '682 patent envisions a process of sequentially substituting new transportable sources during a fill, and having a multitude of transportable assemblies present at the refueling site at any one time. Although this advantageously maximizes the withdrawal of hydrogen from the transportable assemblies, it disadvantageously requires a larger amount of working space in which to store the multiple assemblies. Although the '682 patent mentions the possibility that cascade filling might be used in combination with the multiple transportable assemblies, it does not provide significant guidance regarding a method of cascade filling, or how the configuration of the cascade might be employed to optimize the utility of the transportable assemblies. Further, the '682 patent mentions the use of manifolded arrays of cylinders. For applications requiring smaller total quantities of hydrogen, this disadvantageously increases the cost and complexity of the transportable assemblies, and requires that they be of a fixed, pre-manufactured configuration.

Although the transportable solutions described above permit some reduction of site costs, they require assemblies of fixed configuration, complete with control systems, manifolded piping systems, and various other support equipment. The combination of these features disadvantageously increases the cost and complexity of the deliverable solution. Furthermore, in situations where the demand for hydrogen is variable over time, it may be economically-undesirable to provide the single fixed size of transportable system, as the transportable system becomes the minimum unit of supply. This contrasts with other methods of supplying compressed gases in single cylinders or packages of cylinders which are individually connected at the point of use.

SUMMARY OF THE INVENTION

The present invention advantageously provides a dispenser apparatus for refueling a vehicle, where the dispenser apparatus includes a first cascade stage having a first connector configured to connect to and disconnect from a first gas storage vessel, and a first conduit connected to the first connector and having a first valve and a first pressure measuring device, and a second cascade stage having a second connector configured to connect to and disconnect from a second gas storage vessel, and a second conduit connected to the second connector and having a second valve and a second pressure measuring device. The dispenser apparatus also includes a common flow path fluidly connected to the first conduit and the second conduit, where the common flow path has a dispensing nozzle configured to connect to the vehicle during refueling. And, the dispenser apparatus further includes a controller configured to control the first valve and/or the second valve to perform refueling of the vehicle using gas stored in at least one of the first gas storage vessel and the second gas storage vessel based on pressure measurements of the first pressure measuring device and/or the second pressure measuring device.

The present invention also advantageously provides a system for refueling a vehicle, where the system includes a dispenser apparatus including a first cascade stage having a first connector configured to connect to and disconnect from a first gas storage vessel, and a first conduit connected to the first connector and having a first valve and a first pressure measuring device, and a second cascade stage having a second connector configured to connect to and disconnect from a second gas storage vessel, and a second conduit connected to the second connector and having a second valve and a second pressure measuring device. The dispenser apparatus also includes a common flow path fluidly connected to the first conduit and the second conduit, where the common flow path has a dispensing nozzle configured to connect to the vehicle during refueling. The system further includes a controller configured to control the first valve and/or the second valve to perform refueling of the vehicle using gas stored in at least one of the first gas storage vessel and the second gas storage vessel based on pressure measurements of the first pressure measuring device and/or the second pressure measuring device.

The present invention also advantageously provides a dispenser apparatus for refueling a vehicle, where the dispenser apparatus includes a plurality of cascade stages. At least two cascade stages of the plurality of cascade stages each have a connector configured to connect to and disconnect from a gas storage vessel, and a conduit connected to the connector and having a valve and a pressure measuring device. The conduits of the at least two cascade stages are fluidly connected to a common flow path, where the common flow path has a dispensing nozzle configured to connect to the vehicle during refueling. The dispensing apparatus also includes a controller configured to control the valves of the at least two cascade stages to perform refueling of the vehicle using at least one of at least two cascade stages based on pressure measurements of the pressure measuring device.

The present invention also advantageously provides a method of refueling a vehicle, where the method includes providing a plurality of cascade stages. At least two cascade stages of the plurality of cascade stages each have a connector configured to connect to a gas storage vessel, and a conduit connected to the connector and having a valve and a pressure measuring device. The conduits of the at least two cascade stages are fluidly connected to a common flow path, where the common flow path has a dispensing nozzle configured to connect to the vehicle during refueling. The method also includes controlling the valves of the at least two cascade stages to perform refueling of the vehicle using at least one of at least two cascade stages based on pressure measurements of the pressure measuring device.

BRIEF DESCRIPTION OF THE DRAWINGS

A more complete appreciation of the invention and many of the attendant advantages thereof will become readily apparent with reference to the following detailed description, particularly when considered in conjunction with the accompanying drawings, in which.

DETAILED DESCRIPTION OF EXEMPLARY EMBODIMENTS OF THE INVENTION

Figure 1:
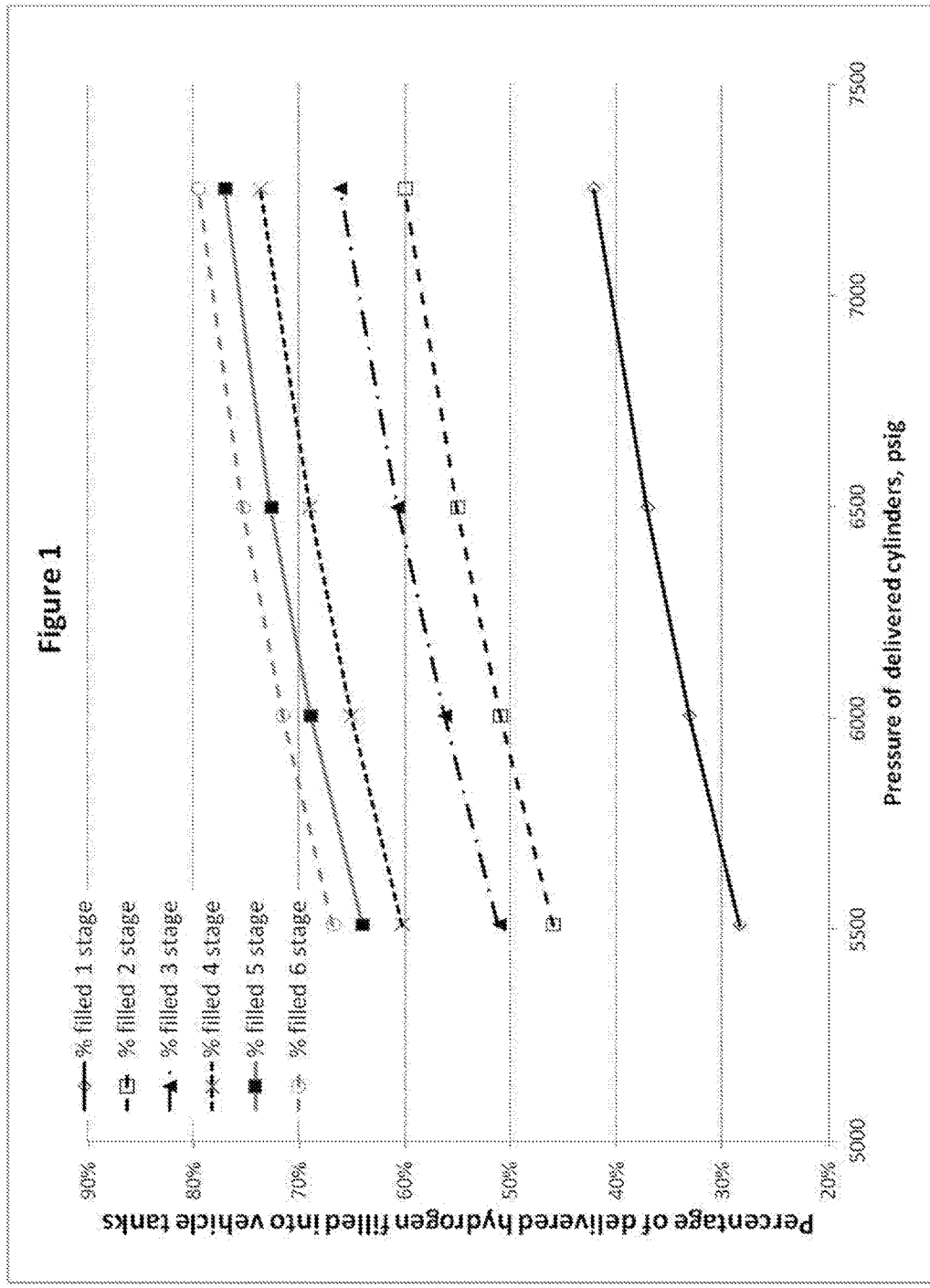
FIG. 1 is a representative graph of the percentage hydrogen withdrawn from a cascade of a fixed volume versus the number of stages of cascade filling employed.

Described herein are a method and an apparatus for refueling hydrogen vehicles at a point remote from the hydrogen production which uses a cascade of compressed hydrogen sources which can vary in complexity from the extreme of a single source, to the maximum number of sources for which the dispenser apparatus is manufactured. The quantity and size of delivered gas sources may be adjusted to suit the volume of demand and the available equipment and quantity of compressed gas without any alteration to the refueling system.

An embodiment of the present invention provides a method of refueling hydrogen powered vehicles that employs delivered pressure cylinders that are pressurized to a pressure that is preferably greater than the intended vehicle fill pressure, connecting the delivered cylinders to a dispenser apparatus, and refilling vehicles without recompression at the refueling site from cylinders via the dispenser apparatus. The dispenser apparatus can be either transported to and from the site on a mobile platform, or it can be installed at the site, while the cylinders are transported to and from the site for refilling at a remote location, either singly or in groups.

The dispenser apparatus for executing the method has at least two cascade stages, each with a separate source of hydrogen. However, the dispenser apparatus is able to operate with at least one cylinder present as the hydrogen supply, and with any number between one and the maximum number of cascade stages physically-incorporated into the dispenser. Although individual cylinders may be fluidly-connected together for the purposes of increasing capacity of a single cascade stage as has long been practiced in the art, the dispenser does not rely on any automatic control elements associated with the delivered cylinders or assemblies of cylinders to effect the vehicle fill.

The type and size of the delivered cylinders are not a limiting aspect of the present invention. It is, however, important to note that vehicles can only be filled to the maximum pressure of the delivered hydrogen. Thus, it is most practical to employ cylinders pressurized to a pressure greater than the intended vehicle fill pressure, and having an aggregate volume greater than that of the vehicle tank being filled. However, the dispenser apparatus is capable of utilizing lower-pressure cylinders as a supply source to effect a partial fill of a hydrogen powered vehicle, and to use smaller cylinders. In effect, one key advantage of the present method is that any pressurized cylinder charged with hydrogen may potentially be used as the source of hydrogen for refilling vehicles. This advantageous aspect of the embodiment of the present invention minimizes the possibility that the supply of hydrogen to a location will be interrupted due to purely logistical problems, such as a shortage of proprietary cylinders or mobile cylinder assemblies.

Embodiments of the present invention will be described hereinafter with reference to the accompanying drawings. In the following description, the constituent elements having substantially the same function and arrangement are denoted by the same reference numerals, and repetitive descriptions will be made only when necessary.

FIG. 1 shows the amount of hydrogen which can be recovered from a fixed volume of delivered cylinders when they are used to fill hydrogen vehicle tanks. The analysis is based on pressurizing vehicle tanks intended to be filled to 5,000 psig from an initial, empty condition of 150 psig. The lines represent the amount of delivered hydrogen actually filled into vehicles by the time that the last vehicle achieves a 75% full condition. As the graph shows, both the pressure of the delivered hydrogen and the number of cascade stages are important variables in determining the percentage of delivered hydrogen which can be transferred through the cascade fill process.

The delivered hydrogen pressure is limited by the technology of pressure cylinders, valves, regulators, fittings and all of the relevant components involved in the hydrogen refueling system. Thus, it is not viable to continuously-increase the delivered pressure as a means of increasing the recovery of hydrogen. However, it is possible to install a large number of cascade stages. Thus, the dispenser of embodiments of the present invention uses at least 2 stages of cascade, thus presenting at least one alternative mode of operation with a fewer number of connected cylinders per the present invention. In one embodiment, the dispenser uses five stages. In yet another embodiment, the dispenser uses 6 stages (see, e.g., configuration shown in FIG. 2). In yet further embodiments, the dispenser may include more than six stages of cascade.

Figure 2:
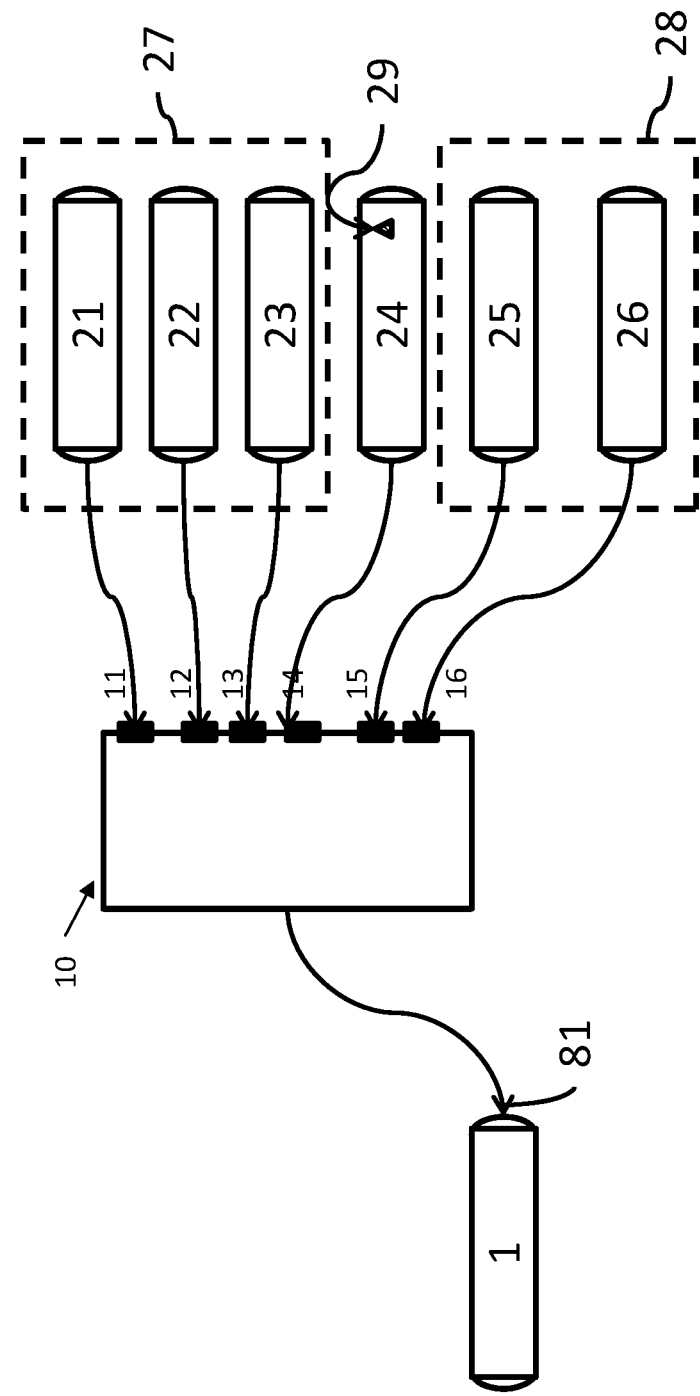
FIG. 2 is a schematic showing an embodiment of the present invention and a relationship between a dispenser apparatus, gas cylinders and a vehicle tank being refilled.

FIG. 2 shows the vehicle tank 1 being filled by the dispenser apparatus 10, which is connected to gas cylinders (or gas storage vessels) 21 through 26. Each gas cylinder forms the minimum element of a single cascade stage, and is connected to the dispenser by its associated connection 11 through 16. The connections may be flexible connections such as high pressure hose, or they may be metal pipe or tubing. The cylinders 21 through 26 may be delivered singly, as indicated for cylinder 24. Alternatively, the cylinders may be grouped in pairs as cylinders 25 and 26 are grouped in rack 28. Likewise, larger numbers may be grouped within a rack, such as the three cylinders 21, 22 and 23 in rack 27. In general, the number of cylinders which may be grouped in a rack, or carrier is not a limiting aspect of the present invention. In industry, it is common practice for individual cylinders to be grouped in racks with 6, 12 or more individual cylinders. The type and size of such racks is generally dictated by law or industry standards, or by practical considerations such as the lifting capacity of regularly-employed equipment, none of which are factors which limit the present invention.

In an alternative embodiment of the present invention, the individual cylinders 21 through 26 may be supplemented by more than one individual cylinders to form the gas source for a single cascade. Such cylinders may be connected together via piping either in transport, or at the refueling site.

Although FIG. 2 illustrates the multiple cylinders as being approximately alike in size, it is not necessary that they be the same size. The type and size of the delivered cylinders are not a limiting aspect of the present invention. It is, however, important to note that vehicles can only be filled to the maximum pressure of the delivered hydrogen. Thus, it is most practical to employ cylinders pressurized to a pressure greater than the intended vehicle fill pressure, and having an aggregate volume greater than that of the vehicle tank being filled. However, the dispenser apparatus is capable of utilizing lower-pressure cylinders as a supply source to effect a partial fill of a hydrogen powered vehicle, and to use smaller cylinders. In effect, one key advantage of the present method is that any pressurized cylinder charged with hydrogen may potentially be used as the source of hydrogen for refilling vehicles. This advantageous aspect of the embodiment of the present invention minimizes the possibility that the supply of hydrogen to a location will be interrupted due to purely logistical problems, such as a shortage of proprietary cylinders or mobile cylinder assemblies with associated controls, as has been previously taught in the field.

Means of preventing inadvertent connection between gas cylinders containing different materials or operating at different pressures are well known. These include the use of gas specific fitting shapes such as those standardized by the Compressed Gas Association, which are specific to certain types and pressure ranges of gases. Other known means include conspicuous labeling and training of personnel. Likewise, it is common practice for cylinders to be provided with unique identifiers such as serial numbers, bar codes, etc. in order to track the cylinder through its life cycle. The dispenser optionally includes a cylinder identification indicia/device/means 29, which permits positive identification of the individual cylinders being used to supply hydrogen. Although in FIG. 2 this identification means is shown only on cylinder 24, it is possible to apply equivalent means 29 to every cylinder. The identification of the cylinders can be used for multiple purposes, including a safety interlock to prevent inadvertent refueling from a cylinder with unidentified contents or service pressure, identification of cylinders suffering from leaks, tracking the number of fill and discharge cycles experienced by an individual cylinder, billing customers based on delivered hydrogen quantities, or geographic location of the cylinder to prevent theft or misappropriation of cylinder assets. The identification of cylinders may be by any convenient means 29, including manual input of data stamped or printed on the cylinder, optical scan of a barcode or other optical data array, RFID scan or any other means known in the art. The data collected from the cylinders may be communicated to a remote location, or it may be processed and stored for use and subsequent extraction at the refueling location.

Figure 3:
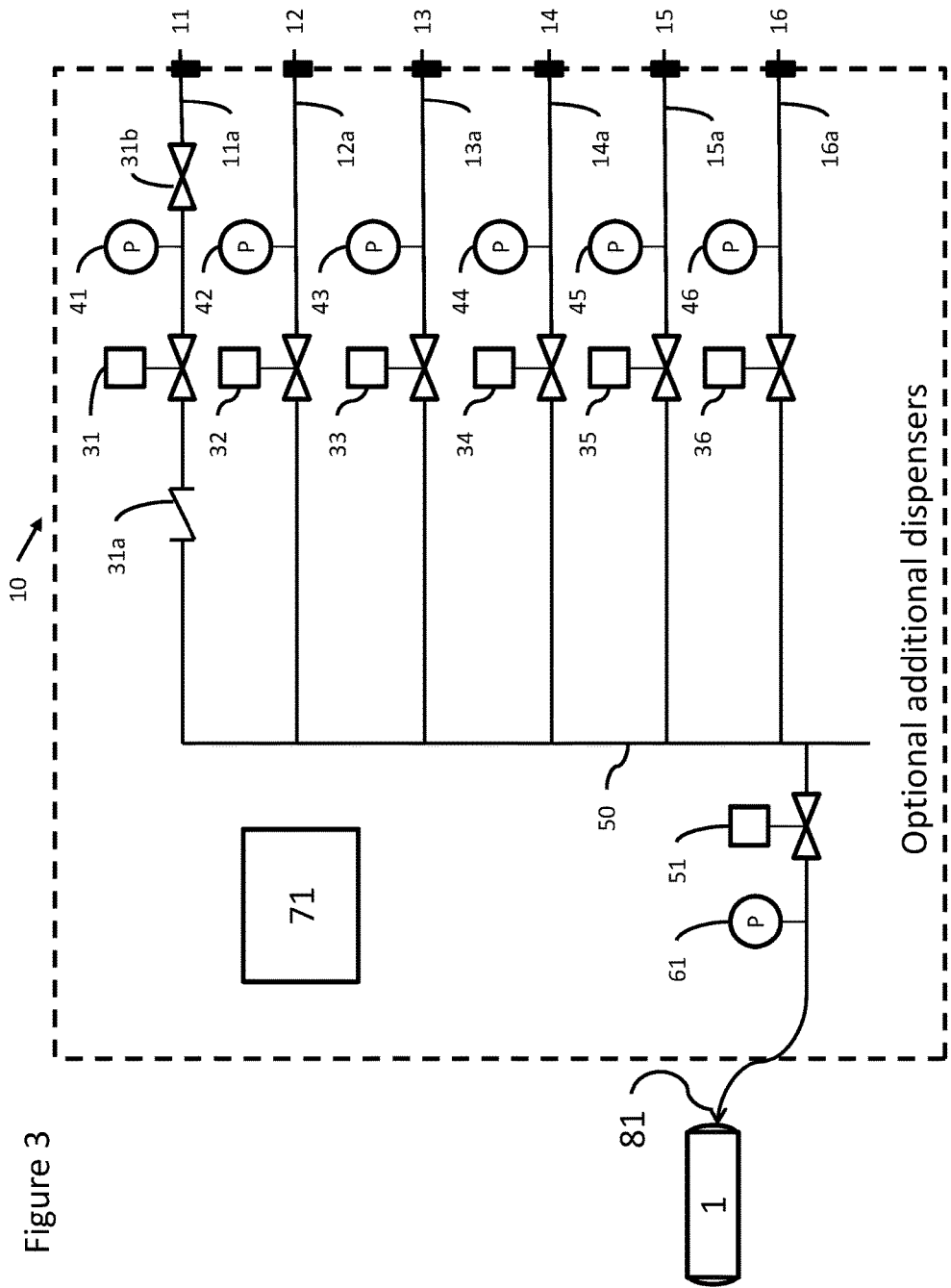
FIG. 3 is a simplified schematic showing elements of a dispenser apparatus according to an embodiment of the present invention.

FIG. 3 shows that the dispenser apparatus 10 includes the connections or connectors 11 through 16 corresponding to FIG. 2. Each of the cascade stages is provided with at least an associated automatic valve 31 through 36, and a pressure measuring device (or sensor) 41 through 46 that are provided along respective conduits 11a through 16a that are connected to respective connectors 11 through 16. The automatic valves 31 through 36 can be controlled by an actuator, like a solenoid or pneumatic actuator, or a stepper motor actuator. Taking the example of the cascade stage supplied by cylinder 21 through connection 11, valve 31 is able to be commanded to selectively open or close in response to a signal generated by a dispenser controller (also referred to herein as control system) 71. For all of the functions of the embodiment to operate, it is necessary for the valve 31 to be able to prevent reverse flow. However, if the valve is of a type which lacks the ability to prevent reverse flow, then a non-return valve 31a must alternatively be provided. This valve may be downstream of the automatic valve as shown in FIG. 3, or it may alternatively be upstream of the valve. It may also be desirable to install a manual isolation valve 31b, to ensure maximum safety during exchange of cylinders once they are emptied of gas. For the purposes of the embodiment of the present invention, the decision to exchange a given exhausted cylinder is not based on attaining a single, defined value, but may instead be chosen by the user of the dispenser to suit local conditions and preferences. Other accessories as are frequently employed in piping systems, such as bleed valves, fittings, pressure relief valves, gauges, etc. may be optionally added to one or more of the cascade stages without altering the function of the apparatus. It is also not necessary that every stage be identical, use the same type or size of valves, piping, etc. Although FIGS. 2 and 3 illustrate an embodiment of the present invention equipped with six stages of cascade, it is possible to construct the inventive dispenser apparatus with as few as two stages. FIG. 2 also does not illustrate elements often required in hydrogen dispensers, such as the dispenser housing, user interface, condensate removal subsystem, etc. The present invention may be used with any of the known arrangements and configurations used in the normal course of dispensing hydrogen into vehicles.

The several cascade valves 31 through 36 discharge in fluid communication to a common flow path 50 leading eventually to the vehicle tank 1. Such connections usually include a dispenser valve assembly, as well as a flexible hose along with other typical ancillaries as may be required locally for vehicle refueling. Such details are usually stipulated by law or regulation, and do not limit the practice of the present invention. A pressure sensor 61 is provided within the dispenser apparatus unless a signal relaying the vehicle tank pressure can be obtained by the control system 71 from a sensor mounted on the vehicle. A final isolation valve 51 may optionally be provided.

It is possible to connect more than one final dispensing nozzle 81 to serve more than one vehicles or to fill vehicles at more than one location. For this purpose, the pressure sensing device (or pressure sensor) 61, or its equivalent externally-provided signal to control system 71, and the isolation valve 51 and any associated non-return valve would need to be duplicated for each additional point of dispensing in order to selectively permit and stop hydrogen flow based on the pressure present in the respective vehicle tank. It is possible that these components, as well as typical refueling components such as hoses, fill nozzles, etc. could be located at a remote location from the rest of the dispenser, connected by either a common supply pipe to convey hydrogen from the cascade valves 31 through 36, or by multiple dedicated lines. Likewise, the control system 71 could be connected to those remote locations by any convenient means, such as by wires, fiber optic communications, or via any of the convenient wireless communications means. Further, it is reasonable to assume that some elements of the control system 71, such as the human machine interface, might be distributed to one or more remote locations.

Embodiments of the present invention specifically foresee the combination of the various components associated with the filling operation into a pre-manufactured modular assembly, which can be rapidly installed at the refueling site either in an integrated, close-coupled manner with the balance of the dispenser apparatus 10, and/or at distributed locations remote from the balance of the dispenser apparatus 10. Such a pre-manufactured modular assembly would desirably reduce the cost and complexity of installation of the dispenser at the refueling site.

Figure 4:
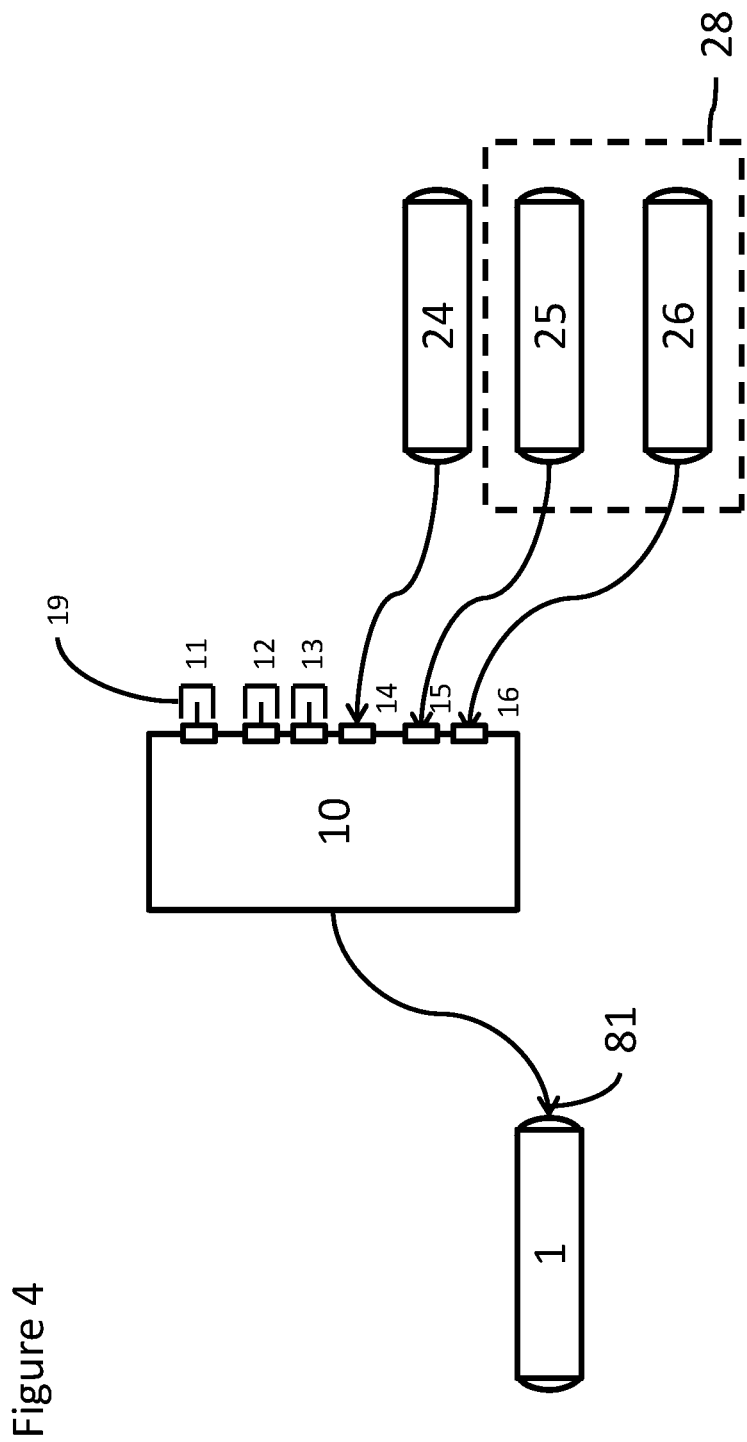
FIG. 4 is a schematic showing one alternative mode of operation of the dispenser apparatus, gas cylinders and vehicle tank shown in FIG. 2.

FIG. 4 shows the dispenser apparatus 10 for executing an embodiment of a method of the present invention utilizing at least three cascade stages, in this case as in FIG. 2, being configured to use a maximum of six stages of cascade. However, the dispenser apparatus is able to operate with at least one cylinder present as the hydrogen supply, and with any number between one and the maximum number of cascade stages physically-incorporated into the dispenser. In FIG. 4, a single cylinder 24 is connected, as are two cylinders 25 and 26 delivered in rack 28. The normal points of connection 11 through 13 are optionally provided with a protective cap 19 or plug instead of their normal fluid connection means. The dispenser apparatus 10 is able to detect that fewer than the maximum number of cascade sources are connected, and to reconfigure it's operation in order to execute a cascade refilling operation using the number of cascade sources/cylinders which are actually present. The dispenser apparatus 10 can detect that fewer than the maximum number of cascade sources are connected, for example, by using the control system 71 to read signals from the pressure measurement devices (e.g., pressure measurement devices 41-46), or by scanning the indicia or cylinder identification means 29 in the source vessels by the technician who drops off the fuel. The latter would be a more reliable method, since the sensors could be tricked by leakage through the valves.

Although FIG. 4 illustrates the case of three cylinders 24, 25 and 26 connected to three cascade connections, the dispenser apparatus 10 is able to operate with any number of cylinders connected, and to any combination of cascade connection points 11 through 16. Likewise, the number of cylinders connected together to a single cascade, or alternatively the pressure of those cylinders, is likewise not limiting.

The dispenser apparatus 10 may be provided with an associated storage rack to facilitate stacking single cylinders or assemblies of cylinders such as 27 or 28 in order to minimize the space required at the refueling site. The cylinders may be individually removed from the rack and exchanged, or may be exchanged in groups. Alternatively, the entire rack may be moved as a single unit, with or without cylinders or groups of cylinders, and with or without the dispenser itself, should that prove convenient. In yet another embodiment, cylinders may be incorporated into racks which themselves are stackable, permitting ready handling of cylinders at the refueling site, in transit, and during the process of refilling. Methods of, and apparatus for grouping cylinders for safe shipment and onsite storage and handling are well known, and are covered by national and international regulations and standards. The dispenser can be used with any of the commonly-used cylinder transport methods without limitation.

In one embodiment of the dispenser apparatus 10, the control system 71 compares the several pressure measurements from the pressure measurement devices 41 through 46 associated with the installed number of cascade valves 31 through 36. The lowest of the pressures is used as the first stage of the cascade refilling the vehicle tank 1 irrespective of the physical order of connection of that cascade stage, and each subsequent higher pressure is used in turn. In one embodiment, this algorithm is applied only on an infrequent basis, such as a reset of the system. The reset function would be used, for instance, in the case that emptied cylinders are removed for refilling, or replaced by full cylinders, or if additional cylinders are added to a dispenser which was previously operating with less than the full number of cylinders connected to the dispenser apparatus 10. For example, if the cylinders 21, 22 and 23 in rack 27 were added to the configuration illustrated in FIG. 4 to yield the configuration of FIG. 2, then the reset function would be applied.

In another embodiment of the invention, the cascade pressure algorithm would be applied at each filling event. One advantage of this alternative embodiment is that should the relative order of pressure between cascade stages change between reset events due to differences in the starting pressure of vehicle tank 1, due to differences in capacity of the various cylinders attached to the cascade stages, or due to a defect such as a leak in the cylinder, valves, or piping system associated with a cascade stage, the cascade pressure algorithm would compensate, allowing for continued proper function. Further, if the control system 71 is provided with a memory function, the dispenser apparatus 10 could generate an alarm indication when the relative position of the cascades change. This alarm could then be used for planning inspection and service of cylinders, for instance. Such service could be conducted at the site of refueling, at the site where the cylinders are refilled, or at any other location. Variations of this alternative embodiment could apply the reset algorithm before each fill, after each fill, or at some periodic interval. Such variations do not alter the fundamental operation of the dispenser of the present invention.

In one embodiment of the present invention, the dispenser apparatus 10 control system 71 can use the data obtained from the cylinder identification means 29 to identify how many gas cylinders are connected to the dispenser. This would advantageously reduce the amount of computation necessary in executing the cascade pressure algorithm. A further advantage of this alternative embodiment is that slow leakage of gas through a valve 31 or non-return valve 31a in the case of operation without a cylinder connected to point 11, as shown in FIG. 4, would not result in an inadvertent attempt to fill vehicle tank 1 from the cascade stage. Such an inadvertent fill would not be harmful in the alternative embodiments not employing the means 29 to lock out the cascade stage having valve 31, but it would save the time during refilling vehicle tank 1 necessary to open valve 31, check the pressures of the cascade pressure sensor 41 versus the vehicle pressure 61, and then command the valve 31 to close. The embodiment employing means 29 to lockout unused cascade stages also reduces the number of actuation cycles by the valve 31. In so doing, it prolongs the maintenance interval of the dispenser apparatus 10.

The dispenser apparatus 10 control system 71 is optionally provided with a remote communications means, through which the dispenser can provide data regarding the refueling process to a remote location. Any of the commonly-used remote communication means may be used, including permanently-connected telecommunications links, removable data storage media or wireless links. The actual mechanism of connection is not limiting. The data transmitted by the dispenser can be used for identifying operational problems, scheduling maintenance, planning cylinder exchange, identifying the use of unauthorized cylinders, tracking the frequency of vehicle refills by vehicle and/or by driver, and for interrupting or restoring function of the refueling system remotely, as in the case of non-payment for delivered hydrogen fuel, natural disaster, etc.

In an embodiment of the present invention, the data collected from numerous dispenser apparatuses 10 at one or more refueling sites is entered into a data management software.

The processes in the embodiments of the present invention may be implemented using any combination of computer programming software, firmware, or hardware. The computer program may be stored in one or more machine readable storage mediums such as hard drives, diskettes, optical disks, magnetic tape, semiconductor memories such as read-only memories (ROMs), programmable ROMs (PROMs), random access memory (RAM), etc. An embodiment of the present invention can include a non-transitory computer readable medium storing a program which, when executed by one or more processors, cause an apparatus to perform the functions described herein, for example, as it relates to the functions of the control system 71.

Figure 5:
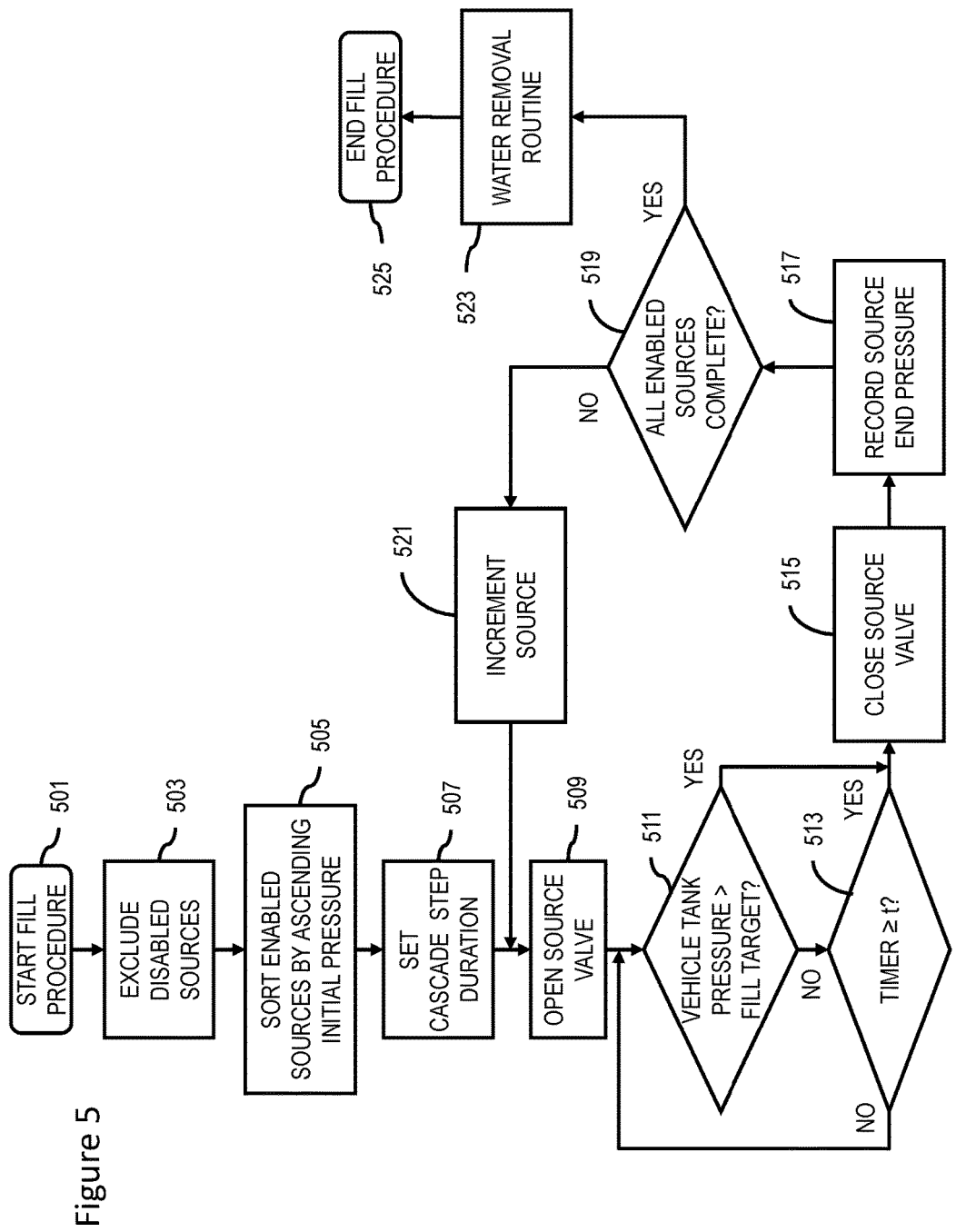
FIG. 5 shows an illustrative embodiment of a fill procedure of the dispenser apparatus.

FIG. 5 shows an illustrative embodiment of a fill procedure of a dispenser apparatus 10. The process in FIG. 5 is performed by control system 71 in conjunction with the other components of the dispenser apparatus, for example, as shown in FIG. 3, such as automatic valve(s) 31 through 36 (and any associated non-return valve 31a, and/or a manual isolation valve 31b), and pressure measuring device(s) (or sensor(s)) 41 through 46, isolation valve 51, pressure sensing device (sensor) 61, and any other information received by the control system 71 such as cylinder identification indicia/device/means 29.

In step 501, the control system 71 starts the fill procedure. Upon initiation of the fill procedure, in step 503, the control system 71 excludes from the fill procedure any fuel sources (e.g. cylinders 21 through 26) which are disabled, such as those fuel sources which are not connected to connectors (e.g., connectors 11 through 16) of the dispenser apparatus or those fuel sources that are empty or low on fuel. Step 503 can be performed by the control system 71 by receiving a signal from each of the pressure measuring device(s) (or sensor(s)) 41 through 46, or retrieving previously stored pressure data from each of the pressure measuring device(s) (or sensor(s)) 41 through 46 taken after the last fill procedure, which was stored in a memory of the control system 71 as pressure data array. If pressure measurements are taken during step 503, then those measurements are stored in the pressure data array.

In step 505, the enabled fuel sources (i.e., the fuel sources that were not determined to be disabled in step 503) are sorted and ordered by ascending initial pressure by the control system 71. The ordering of enable fuel gas sources can be conducted by referring to the pressure data array. The control system 71 then uses the ascending order to refuel the vehicle by sequentially using gas from gas storage vessels of a plurality of cascade stages in a cascade refueling process beginning with refueling using gas from the gas storage vessel with a lowest detected pressure and successively refueling using gas from the gas storage vessel with a successively higher detected pressure, as further described below.

In step 507, a duration of each step of the cascade process is set by the control system 71. The duration can be set by calculating the duration as a function of the pressure (i.e. source pressure) of the fuel source. For example, a step duration time, t, can be calculated by setting t=90 seconds if source pressure, p, is less than 1000 psig; and, if the source pressure, p, is greater than or equal to 1000 psig, then setting t (seconds)=90−0.0048×(p−1000). Alternatively, the duration can be set using a fixed time duration. In another alternative, the duration of each step of the cascade can be set by controlling the relative values of the source pressure and the vehicle tank pressure.

After the enabled fuel sources are ordered, then the control system 71 opens the actuated valve (i.e., automatic valve(s) 31 through 36) of the first fuel source of the sorted enabled fuel sources in step 509.

In step 511, the control system 71 determines whether or not the pressure in the vehicle tank 1 is greater than the fill target pressure of the vehicle tank. The control system can determine the pressure in the vehicle tank 1, for example, by receiving a pressure measurement from pressure sensing device (or pressure sensor) 61 when the dispensing nozzle 81 is connected to the vehicle tank 1. The control system can set the fill target pressure based on, for example, the ambient temperature. For example, if the ambient temperature is greater than or equal to fifty-nine degrees Fahrenheit, then the fill target pressure can be set at 5000 psig. And, if the ambient temperature is less than fifty-nine degrees Fahrenheit, then the fill target pressure (psig)=5000×((459.7+ambient temperature)÷518.7). In step 511, if the control system 71 determines that the pressure in the vehicle tank 1 is not greater than the fill target pressure of the vehicle tank, then the procedure moves to step 513. In step 511, if the control system 71 determines that the pressure in the vehicle tank 1 is greater than the fill target pressure of the vehicle tank, then the procedure moves to step 515, and the actuated valve (i.e., automatic valve(s) 31 through 36) of the first fuel source of the sorted enabled fuel sources that was opened in step 509 is closed.

In step 513, the control system 71 determines whether or not a timer that begins running when the actuated valve (i.e., automatic valve(s) 31 through 36) of the first fuel source of the sorted enabled fuel sources that was opened in step 509 is greater than or equal to the cascade step duration time, t, set in step 507. While the timer value is less than the cascade step duration time, t, the procedure loops back to step 511. Thus, the actuated valve remains open unless the parallel logical operator of the control system 71 comparing the vehicle tank pressure to the fill target pressure in step 511 causes the valve to be closed. Also, when the control system 71 determines that the timer value is greater than or equal to the cascade step duration time, t, then the procedure moves to step 515, and the actuated valve (i.e., automatic valve(s) 31 through 36) of the first fuel source of the sorted enabled fuel sources that was opened in step 509 is closed.

In step 517, the control system 71 receives a signal from the pressure measuring device (e.g., pressure measuring(s) (or sensor(s)) 41 through 46) of the fuel source(s) used during the current cascade step (i.e., for which the valve was opened in step 509 and closed in step 515), and the pressure valve is recorded in the pressure data array in the memory of the control system 71 for use in the next fill procedure.

In step 519, the control system 71 determines whether or not cascade steps for all enabled fuel sources are completed. Additionally, the control system 71 can determine in step 519 whether or not the vehicle tank pressure has reached the fill target pressure, for example, by receiving a pressure measurement from pressure sensing device (or pressure sensor) 61 when the dispensing nozzle 81 is connected to the vehicle tank 1. If the answer (or answers) in step 519 is (are) no, then the procedure moves to step 521. Thus, if further enabled fuel sources remain and the pressure in the vehicle tank has not reached the fill target pressure, then the filling procedure proceeds to step 521 and the next enabled fuel source is incremented in ascending pressure order and the procedure then returns to step 509 to open the valve of the next enabled fuel source.

In the above manner, the control system 71 can sequentially control the valves of the fuel sources to perform a cascading refueling process of the vehicle based on pressure measurements of the pressure measuring devices.

If the answer (or answers) in step 519 is (are) yes, then the procedure moves to optional step 523 or step 525. Thus, if no further enabled fuel sources remain and/or the pressure in the vehicle tank has reached the fill target pressure, then the filling procedure proceeds to optional step 523 or step 525.

After the fuel gas filling is completed, a condensate water removal routine can be performed in step 523. Although many current hydrogen vehicles require condensed water removal, some do not, and therefore the presence or absence of water removal is not a limiting aspect of the dispenser apparatus 10.

In step 525, the control system 71 ends the fill procedure.

It should be noted that the exemplary embodiments depicted and described herein set forth the preferred embodiments of the present invention, and are not meant to limit the scope of the claims hereto in any way. Numerous modifications and variations of the present invention are possible in light of the above teachings. It is therefore to be understood that, within the scope of the appended claims, the invention may be practiced otherwise than as specifically described herein.

What is claimed is:

1. A dispenser apparatus for refueling a fuel tank of a hydrogen-fueled vehicle, the dispenser apparatus comprising:
   a first cascade stage having:
      a first connector configured to connect to and disconnect from a first gas storage vessel; and
      a first conduit connected to the first connector, and having a first valve and a first pressure measuring device;
   a second cascade stage having:
      a second connector configured to connect to and disconnect from a second gas storage vessel; and
      a second conduit connected to the second connector, and having a second valve and a second pressure measuring device;
   a common flow path fluidly connected to the first conduit and the second conduit, the common flow path having a dispensing nozzle configured to connect to a fuel tank of the hydrogen-fueled vehicle during refueling of the fuel tank; and
   a controller configured to control the first valve and/or the second valve to perform refueling of the hydrogen-fueled vehicle using gas stored in at least one of the first gas storage vessel and the second gas storage vessel based on pressure measurements of the first pressure measuring device and/or the second pressure measuring device.

2. The dispenser apparatus according to claim 1,
   wherein the controller is programmed to control the cascade refueling process by detecting pressure of gas within the first gas storage vessel and the second gas storage vessel and controlling the first valve and the second valve based on the detected pressure, and wherein the controller is programmed to refuel the fuel tank of the hydrogen-fueled vehicle by sequencing refueling in a cascade refueling process beginning with refueling using gas from a gas storage vessel selected from the first gas storage vessel and the second gas storage vessel with a lowest detected pressure and successively refueling using gas from another gas storage vessel of the first gas storage vessel and the second gas storage vessel with a successively higher detected pressure.

3. The dispenser apparatus according to claim 1, wherein the first connector and the second connector are configured to allow prefilled gas storage vessels at various gas pressures to be detachably connected thereto, and wherein the controller is configured to perform refueling of the fuel tank of the hydrogen-fueled vehicle using the prefilled gas storage vessels at various gas pressures.

4. The dispenser apparatus according to claim 1, wherein the controller is configured to detect first pressure of gas within the first gas storage vessel and a second pressure of gas within the second gas storage vessel, and wherein the controller is programmed to select an order of use of the first gas storage vessel and the second gas storage vessel to sequence refueling of the fuel tank of the hydrogen-fueled vehicle using gas from the first gas storage vessel and the second gas storage in a cascade refueling process based on the detected first pressure and the detected second pressure.

5. The dispenser apparatus according to claim 4, wherein the controller is configured to detect the first pressure using the first pressure measuring device, wherein the controller is configured to detect the second pressure using the second pressure measuring device, and wherein the controller is configured to sequentially control the first valve and the second valve to perform the cascading refueling process of the fuel tank of the hydrogen-fueled vehicle based on pressure measurements of the first pressure measuring device and the second pressure measuring device.

6. The dispenser apparatus according to claim 4, wherein the controller is configured to determine a connection state of the first gas storage vessel and the second gas storage vessel using data entered by a user.

7. The dispenser apparatus according to claim 1, further comprising:

an isolation valve provided along the common flow path; and an additional pressure measuring device provided along the common flow path, wherein the controller is configured to control the isolation valve to control flow to the fuel tank of the hydrogen-fueled vehicle based on a pressure measurement of the additional pressure measuring device.

8. A system for refueling a fuel tank of a hydrogen-fueled vehicle, the system comprising:

a dispenser apparatus comprising:

a first cascade stage having:

a first connector configured to connect to and disconnect from a first gas storage vessel; and a first conduit connected to the first connector, and having a first valve and a first pressure measuring device;

a second cascade stage having:

a second connector configured to connect to and disconnect from a second gas storage vessel; and a second conduit connected to the second connector, and having a second valve and a second pressure measuring device; and a common flow path fluidly connected to the first conduit and the second conduit, the common flow path having a dispensing nozzle configured to connect to a fuel tank of the hydrogen-fueled vehicle during refueling of the fuel tank; and a controller configured to control the first valve and/or the second valve to perform refueling of the fuel tank of the hydrogen-fueled vehicle using gas stored in at least one of the first gas storage vessel and the second gas storage vessel based on pressure measurements of the first pressure measuring device and/or the second pressure measuring device.

9. A dispenser apparatus for refueling a vehicle, the dispenser apparatus comprising:

a plurality of cascade stages, at least two cascade stages of the plurality of cascade stages each having a connector configured to connect to and disconnect from a gas storage vessel, and a conduit connected to the connector and having a valve and a pressure measuring device, the conduits of the at least two cascade stages being fluidly connected to a common flow path, the common flow path having a dispensing nozzle configured to connect to the vehicle during refueling; and a controller configured to control the valves of the at least two cascade stages to perform refueling of the vehicle based on pressure measurements of the pressure measuring device, wherein the controller is configured to detect pressure of gas within the gas storage vessels of the at least two cascade stages, and wherein the controller is programmed to refuel the vehicle by sequencing refueling in a cascade refueling process beginning with refueling using gas from a gas storage vessel selected from the gas storage vessels of the at least two cascade stages with a lowest detected pressure and successively refueling using gas from another gas storage vessel of the gas storage vessels of the at least two cascade stages with a successively higher detected pressure.

10. The dispenser apparatus according to claim 9, wherein the connectors of the at least two cascade stages are configured to allow prefilled gas storage vessels at various gas pressures to be detachably connected thereto, and wherein the controller is configured to perform refueling of the vehicle using the prefilled gas storage vessels at various gas pressures.

11. The dispenser apparatus according to claim 9, wherein the controller is programmed to control an order of the gas storage vessels used in the cascade refueling process based upon the detected pressure of gas within the gas storage vessels.

12. A method of refueling a vehicle, the method comprising:

providing a plurality of cascade stages, at least two cascade stages of the plurality of cascade stages each having a connector configured to connect to a gas storage vessel, and a conduit connected to the connector and having a valve and a pressure measuring device, the conduits of the at least two cascade stages being fluidly connected to a common flow path, the common flow path having a dispensing nozzle configured to connect to the vehicle during refueling;

detecting pressure of gas within the gas storage vessels of the at least two cascade stages; and controlling the valves of the at least two cascade stages to perform refueling of the vehicle based on pressure measurements of the pressure measuring device, wherein the refueling is performed by sequencing refueling in a cascade refueling process beginning with refueling using gas from a gas storage vessel selected from the gas storage vessels of the at least two cascade stages with a lowest detected pressure and successively refueling using gas from another gas storage vessel of the gas storage vessels of the at least two cascade stages with a successively higher detected pressure.

13. The method according to claim 12, wherein the refueling of the vehicle is performed using prefilled gas storage vessels at various gas pressures that are detachably connected via the connector of respective stages of the plurality of cascade stages.

14. The method according to claim 12, wherein a controller is programmed to control an order of the gas storage vessels used in the cascade refueling process based upon the detected pressure of gas within the gas storage vessels.

15. The method according to claim 12,
wherein the at least two cascade stages includes a first cascade stage having a first connector configured to connect to a first gas storage vessel, and a second cascade stage having a second connector configured to connect to a second gas storage vessel, and
wherein the valves are sequentially controlled to begin the process to refuel the vehicle using whichever storage vessel of the first gas storage vessel and the second storage vessel is determined to have a gas at a lower pressure.

16. The dispenser apparatus according to claim 4, wherein the controller is programmed to reset the order of the first gas storage vessel and the second gas storage vessel used in the cascade refueling process when one or more gas storage vessel is removed, replaced, or added to one or more of the first cascade stage and the second cascade stage based upon subsequent detection of pressure of gas within the first gas storage vessel and the second gas storage vessel.

17. The system according to claim 8,
wherein the controller is programmed to control the cascade refueling process by detecting pressure of gas within the first gas storage vessel and the second gas storage vessel and controlling the first valve and the second valve based on the detected pressure, and wherein the controller is programmed to refuel the fuel tank of the hydrogen-fueled vehicle by sequencing refueling in a cascade refueling process beginning with refueling using gas from a gas storage vessel selected from the first gas storage vessel and the second gas storage vessel with a lowest detected pressure and successively refueling using gas from another gas storage vessel of the first gas storage vessel and the second gas storage vessel with a successively higher detected pressure.

18. The system according to claim 8,
wherein the controller is configured to detect first pressure of gas within the first gas storage vessel and a second pressure of gas within the second gas storage vessel, and
wherein the controller is programmed to select an order of use of the first gas storage vessel and the second gas storage vessel to sequence refueling of the fuel tank of the hydrogen-fueled vehicle using gas from the first gas storage vessel and the second gas storage in a cascade refueling process based on the detected first pressure and the detected second pressure.

19. The system according to claim 18, wherein the controller is programmed to reset the order of the first gas storage vessel and the second gas storage vessel used in the cascade refueling process when one or more gas storage vessel is removed, replaced, or added to one or more of the first cascade stage and the second cascade stage based upon subsequent detection of pressure of gas within the first gas storage vessel and the second gas storage vessel.

20. The dispenser apparatus according to claim 11, wherein the controller is programmed to reset the order of the gas storage vessels used in the cascade refueling process when one or more gas storage vessel is removed, replaced, or added to one or more of the plurality of cascade stages based upon subsequent detection of pressure of gas within the gas storage vessels.

21. The method according to claim 14, wherein the controller is programmed to reset the order of the gas storage vessels used in the cascade refueling process when one or more gas storage vessel is removed, replaced, or added to one or more of the plurality of cascade stages based upon subsequent detection of pressure of gas within the gas storage vessels.

* * * * *